(12) United States Patent
Awal et al.

(10) Patent No.: US 12,494,652 B2
(45) Date of Patent: Dec. 9, 2025

(54) CAPACITY-OPTIMIZED GRID-FORMING CONTROL

(71) Applicant: EPC Power Corporation, Poway, CA (US)

(72) Inventors: M A Awal, Poway, CA (US); David Michaud, Poway, CA (US)

(73) Assignee: EPC Power Corporation, Poway, CA (US)

(*) Notice: Subject to any disclaimer, the term of this patent is extended or adjusted under 35 U.S.C. 154(b) by 0 days.

(21) Appl. No.: 18/677,830

(22) Filed: May 29, 2024

(65) Prior Publication Data

US 2025/0239861 A1 Jul. 24, 2025

Related U.S. Application Data

(60) Provisional application No. 63/622,456, filed on Jan. 18, 2024.

(51) Int. Cl.
*H02J 3/40* (2006.01)
*G06F 1/30* (2006.01)
(Continued)

(52) U.S. Cl.
CPC ............ *H02J 3/40* (2013.01); *G06F 1/305* (2013.01); *H02J 3/004* (2020.01); *H02J 3/46* (2013.01);
(Continued)

(58) Field of Classification Search
CPC ...... H02J 3/40; H02J 3/004; H02J 3/46; H02J 2203/10; H02J 2203/20; H02J 3/381; H02J 3/48; G06F 1/305
(Continued)

(56) References Cited

U.S. PATENT DOCUMENTS 11,108,235 B1 8/2021 Awal et al.
2019/0006848 A1 1/2019 Parashar et al.
(Continued)

FOREIGN PATENT DOCUMENTS

CN 116054148 * 5/2023

OTHER PUBLICATIONS

PCT International Search Report and Written Opinion dated Mar. 26, 2025 in International Application No. PCT/US2025/011988.

*Primary Examiner* — Richard Tan
(74) *Attorney, Agent, or Firm* — Foley & Lardner LLP

(57) ABSTRACT

Capacity-optimized grid-forming is provided. A controller includes a power-synchronization model (PSM). The PSM is configured to receive positive and negative sequence symmetrical components of an output voltage and an output current. The PSM is configured to generate current references including a positive and negative sequence current reference. The PSM is configured to generate an internal voltage phase reference and voltage magnitude reference. The controller includes a capacity constrainer to determine, based on the current references and a capacity limit terms, that a device is capacity constrained. The capacity constrainer is configured to determine optimum complex gains to scale the plurality of current references based on the capacity limit terms. The capacity constrainer is configured to, responsive to the determination of constraint, output scaled current reference to cause a power stage to adjust the output voltage/current, the scaled current reference scaled according to the complex gains.

20 Claims, 7 Drawing Sheets

(51) Int. Cl.
    *H02J 3/00*         (2006.01)
    *H02J 3/46*         (2006.01)

(52) U.S. Cl.
    CPC ....... *H02J 2203/10* (2020.01); *H02J 2203/20* (2020.01)

(58) Field of Classification Search
    USPC .......................................................... 307/24
    See application file for complete search history.

(56) References Cited

U.S. PATENT DOCUMENTS

| | | |
|---|---|---|
| 2021/0249862 A1 | 8/2021 | Awal et al. |
| 2022/0181883 A1 | 6/2022 | Larsen et al. |
| 2022/0366536 A1 | 11/2022 | Li et al. |

\* cited by examiner

600

605
Decomposing a measured or estimated output voltage vector and a measured or estimated output current vector into positive sequence symmetrical components and negative sequence symmetrical components of the measured or estimated output voltage vector and output current vector

610
Generating, by the one or more processors based on the decomposed positive sequence symmetrical components and negative sequence symmetrical components, symmetrical current references

615
Adjusting a combined current reference for a power stage of the grid-forming inverters responsive to determining that the symmetrical current references violate at least one of a plurality of capacity limits

FIG. 6

CAPACITY-OPTIMIZED GRID-FORMING CONTROL

CROSS-REFERENCE TO RELATED APPLICATIONS

The present application claims priority to U.S. Provisional Application No. 63/622,456 filed Jan. 18, 2024, which is incorporated herein by reference in its entirety.

BACKGROUND

The growing push towards inverter-interfaced generation and energy storage resources in the bulk grid has motivated substantial research and development effort on grid-forming (GFM) control. A number of alternative GFM control architectures have emerged, such as Droop Control, virtual synchronous machine (VSM), power synchronization control, and virtual oscillator control (VOC). Despite their distinct embodiments, all GFM control variants fundamentally rely on the so-called Power Synchronization mechanism to achieve frequency equilibrium, i.e., synchronization among the generation/storage resources in an AC electrical grid. In essence, a GFM AC resource operates as a controllable voltage source, which slows down (speeds up) as its real power output increases (decreases). The simple real-power vs frequency droop law forces all GFM resources towards a common frequency through transient transfer of real power among them—this process is termed power synchronization. A notable difference of GFM control architectures from grid-following (GFL) control is the absence of a phase-locked-loop (PLL). Instead, GFM resources define their own frequency and phase reference following the real-power vs frequency droop law.

Unlike synchronous generators, power electronic converters operate under substantially narrower capacity constraints, such as real-power, reactive-power, and current limits. While operating at capacity limits, the power-synchronization process is effectively suspended, often leading to the limitations typical of prior art exemplified by poor ride-through performance or even instability under large grid disturbances (e.g. asymmetrical faults, rapid rate of change of frequency, or phase jumps of the terminal voltage). In the following, an AC grid-forming control is presented which adapts itself while operating under such aforementioned limits in order to retain power-synchronization with the rest of the AC grid while achieving robust ride-through performance in the presence of a variety of transient AC grid disturbances.

BRIEF DESCRIPTION OF THE DRAWINGS

FIG. 6 is a flow chart of an implementation of a method for controlling grid-forming inverters in an electrical grid, according to an embodiment.

Figure 1:
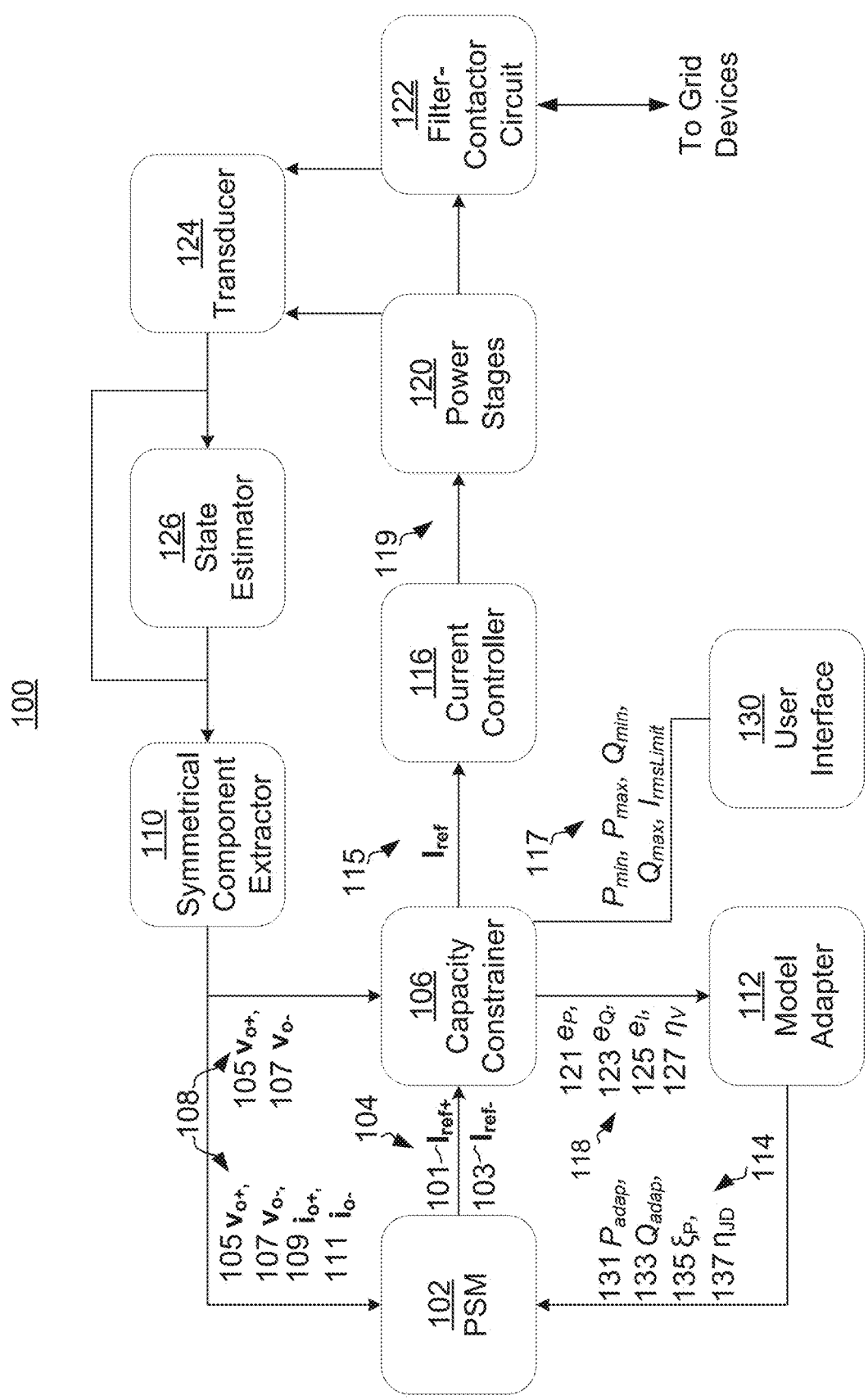
FIG. 1 depicts an example sequence diagram of a control architecture for capacity-optimized grid-forming control, according to an embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Due to their voltage source nature, GFM inverters are particularly vulnerable to fast transients and disturbances on the AC network. To facilitate ride-through of AC disturbances, such as under/overvoltage, under/over frequency, phase jumps, and line faults, a GFM inverter must protect itself against overcurrent or real- or reactive-power overload while retaining transient stability. Moreover, a GFM inverter may need to operate under real- or reactive-power constraints due to hardware capacity, limitation of the associated DC source, or limits imposed by interconnection agreements.

Protection equipment utilized in the AC grid often requires negative-sequence current injection to aid in the identification of faults. In order to realize overcurrent limiting during ride-through events and for negative-sequence current injection, some embodiments of GFM devices may temporarily switch to GFL mode for the duration of the fault. However, such transitioning often involves inhibiting fault triggers to prevent recurring fault-mode operations due to the transients resulting from fault clearance. These strategies are vulnerable to successive fault events within a short span of time.

Structure-preserving control is a preferable solution, i.e., where a control structure (e.g., GFM control) is maintained regardless of nominal vs fault/overloaded operation. Unlike GFL control however, GFM architecture achieves synchronization through transient transfer of real power P, hence current- or power-capacity constrained operation can render the synchronization process challenging. Consequently, current/power-constrained GFM operation may result in limit cycle/oscillatory behavior.

Relevant work aimed at enhancing ride-through performance under faults can be found in U.S. patent application Ser. No. 18/276,409, filed Aug. 8, 2023, the entirety of which is incorporated by reference herein, where the effective inertia of a virtual machine is dynamically adjusted based on the deviation of output real power of the converter from the reference value. In some cases, an additional droop is implemented on the real power reference based on the output current magnitude as well as a frequency correction term is generated based on the quadrature component of the terminal voltage vector under fault events. While both groups of controllers reactively respond to the converter output, the capacity-optimized GFM controller, described in the present disclosure, proactively limits its control effort to enforce the capacity constraints.

Embodiments of the present disclosure can include capacity-optimized grid forming controllers (COGFC). Like other GFM controllers, COGFC can generate output reference signals for inner control layers, such as the current control layer, to provide voltage or frequency support to the associated AC grid. However, if actuated without constraint, such reference signals may correspond to power signals which are not realizable by the grid-connected equipment. For example, the reference signals can provide a demand for 1 GW from a 1 MW source.

Accordingly, the present disclosure provides a capacity constrainer to constrain reference signals according to constraints of energy storage or conversion devices associated with the COGFC. That is, the output reference signals can be constrained prior to provision to an inverter hardware or other power stage associated with the controller. Because the constrained signal may be (or at least better approximate) a signal which is realizable by the power stage, any deviations between the commanded and realized output can be managed. For example, the capacity constrainer can preferentially permit some transient deviations to reduce others (e.g., maintain frequency at the expense of a brief brownout, exceed a power factor to maintain voltage, etc.).

Embodiments of the present disclosure can maintain a grid formed by the COGFC with less (or at least prioritized) deviations, relative to the deviations that arise from providing reference signals which exceed a capacity of a corresponding device in an otherwise undefined manner. Embodiments of the present disclosure can preserve a structure of GFM control under both nominal and fault operation. Embodiments of the present disclosure can adapt to retain power-synchronization (e.g., GFM) nature, and reduce deviations from a most recent reference dispatch (e.g., $\{\omega_{ref};\ V_{ref};\ P_{ref};\ Q_{ref}\}$) by a supervisory control and data acquisition (SCADA) system or plant controller under current- or power-constrained operation. Embodiments of the present disclosure can provide negative-sequence current when subjected to unbalanced faults.

For example, referring now to FIG. 1, an example sequence diagram of a control architecture 100 for capacity-optimized grid-forming control is shown, according to an embodiment. The control architecture 100 can include a dynamic model, such as a droop or virtual synchronous machine model, which may be referred to as a power-synchronization model (PSM) 102, without limiting effect. The PSM 102 can exclude capacity constraints.

The PSM 102 can generate current references 104 such as a positive-sequence symmetrical current reference 101, $i_{ref+}$, and a negative-sequence symmetrical current reference 103, $i_{ref-}$. The PSM 102 can provide the current references 104 to a capacity constrainer 106. The PSM 102 can generate the current references 104 based on decomposed positive- and negative-sequence symmetrical components 108. The decomposed sequence symmetrical components 108 can include, for example, a positive-sequence voltage component 105, $V_{o+}$, negative-sequence voltage component 107, $v_{o-}$, positive-sequence current component 109, $i_{o+}$, and negative-sequence current component 111, $i_{o-}$. The decomposed sequence symmetrical components 108 can be received from a symmetrical component extractor 110 based on estimated or measured output voltage vectors, $v_o$, and estimated or measured output current vectors, $i_o$.

In some embodiments, the PSM 102 can receive adaptation signals 114 from a model adapter 112. The adaptation signals 114 can include various adaptation terms. The adaptation terms can include an adaptation term for active-power and frequency dynamics 131, $P_{adap}$, which may be an adjustment term for the controller's internal frequency in response to changes in real power output. The adaptation terms can include an adaptation term for reactive-power and voltage dynamics 133, $Q_{adap}$, which may be an adjustment term for the controller's internal voltage in response to changes in reactive power output. For example, the PSM 102 can iteratively update the current references 104 based on updated adaptation terms received in the adaptation signals 114. In some embodiments, the adaptation signal can include scaling factors, such as $\xi_P$, a scaling factor 135 for a power reference of the PSM 102, and $\eta_{JD}$, a scaling factor 137 for a droop coefficient of a droop-based PSM 102.

The model adapter 112 can generate the adaptation signals 114 to cause the PSM 102 to adapt to capacity constraints. More particularly, the capacity constrainer 106 can provide indicia of deviations 118 between a commanded output and an expected output, related to various aspects of the output voltage vector and output current vector. The model adapter 112 can generate the adaptation signals 114 including the adaptation terms and scaling factor based on the indicia of the deviations. The indicia of the deviations can include an expected deviation from commanded active power 121, ep and an expected deviation from commanded reactive power 123, $e_Q$. The indicia of the deviations can include an expected deviation from commanded current magnitude 125, e, and a deviation of positive-sequence output voltage magnitude 127, $\eta_V$. The deviation from commanded current magnitude 125 and deviation of positive-sequence output voltage magnitude 127 are later described as normalized values. However, such illustrative examples need not be construed as limiting. Like other data described herein, such normalized values can be substituted for an absolute value (e.g., variance), Boolean indicating a value relative to one or more thresholds values, or other form of indicia (and vice versa).

The PSM 102 can generate the iterative updates based on any combination of: updated adaptation signals 114 and non-updated decomposed sequence symmetrical components 108; updated decomposed sequence symmetrical components 108 and non-updated adaptation signals 114; or based on synchronized or asynchronous updates to both of the adaptation signals 114 and the decomposed sequence symmetrical components 108. That is, the PSM 102 can implement fast loop control for either of the adaptation signals 114 or the decomposed sequence symmetrical components 108 according to a most recent availability thereof, in some embodiments. In some iterations or embodiments, the PSM 102 may not update the current references 104 based on the adaptation signals 114. For example, the adaptation signals 114 or the model adapter 112 may be omitted such that the PSM 102 can operate based on the decomposed sequence symmetrical components 108 without using the adaptation signals 114.

Referring again to the symmetrical component extractor 110, the symmetrical component extractor 110 can determine the decomposed sequence symmetrical components 108 based on a measured or estimated value of an output voltage vector (also referred to as an output voltage, without limiting effect), or an output current vector (also referred to as an output current, without limiting effect). For example, the control architecture 100 can include or interface with one or more sensor-transducers 124 to measure the output state of the output voltage or output current, or one or more models to estimate a current or future state of the output voltage or output current (e.g., a Kalman filter). In some embodiments, the symmetrical component extractor 110 can measure a first subset of the sequence symmetrical or other components of the output voltage and output current and predict, based on the first subset, a second subset of the sequence symmetrical or other components. In various embodiments, the transducers 124 can couple with an output of a circuit at various locations, such as distal or proximal to various filters, contractors, or other protection devices. For example, although depicted as coupling to the power stage 120 and the filter-contactor circuit 122, in some embodiments, the transducers 124 can only couple with one of the power stage 120 or the filter-contactor circuit 122, or another location, such as at one or more remote locations of the grid, at a sink or source device associated with the grid, or so forth.

The component extractor 110 can employ any of various techniques to extract components including the decomposed sequence symmetrical components 108. For example, the component extractor 110 can ingest time-domain voltage or current signals, and apply a transform (e.g., a fast Fourier transform, FFT or S-Transform) to generate a frequency-domain transform, whereupon the component extractor 110 can apply harmonic filtering to identify the fundamental frequency, or various harmonics thereof, and determine a magnitude or phase angle of a positive or negative sequence portion (or other data, such as a zero-sequence component). Such an implementation is not intended to be limiting, for example, in an embodiment, the component extractor 110 applies coordinate transformations to generate a rotating (e.g., dq) frame indicative of a positive-sequence, and further process the transform to generate indicia of the negative sequence, or other data (e.g., the zero sequence component).

The component extraction can be applied to any combination of estimated or measured data. For example, in some embodiments, the component extractor 110 receives data for ingestion from a state estimator 126 which may include, for example, a deterministic model (e.g., a look up table, LUT), or another model such as a neural network, adaptive filter, or state estimator. In some embodiments, a first set of estimated data is used to predict a future state of the extracted components. A second set including at least a portion of measured data, but which may also include estimated data, is used to determine a current state of the extracted components. Such as current state can be used, in turn, to estimate another future state.

Referring again to the capacity constrainer 106, the capacity constrainer 106 can generate a combined current reference 115, $i_{ref}$. The capacity constrainer 106 can generate the combined current reference 115 based on the received current references 104 and an indicia of a capacity constraint. The indicia of a capacity constraint can include an indication of a current output of a power stage 120 of the control architecture 100. The indicia of a capacity constraint can include one or more capacity limit terms 117, such as real power limit, reactive power limit, and output current limit. The capacity limit terms 117 may be received, via a user interface 130 or include predefined values (e.g., default values stored in instructions for one or more processors of a controller of the control architecture 100). In some embodiments, the capacity limit terms 117 may be received from connected equipment such as a battery backup, inverter, or so forth (e.g., corresponding to a state of charge, thermal condition, firmware revision, or other operating state). For example, battery storage may have an output capacity related to a state of charge, and an inverter may have a maximum current or power output related to a thermal condition. In some embodiments, the capacity constrainer 106 can further provide any of the indicia of the capacity constraint to the user interface 130 for presentation.

The capacity constrainer 106 can provide the combined current reference 115 to a current controller 116 for a power stage of the control architecture 100. For example, the current controller 116 can determine a command current and output a voltage control signal 119 to affect the current command. The current controller 116 may include or interface with a modulator to control the power stage 120, as is required for the given power electronic topology (e.g. PWM or phase-angle control) in order to realize the requested controlled quantity (e.g. terminal voltage). Further depicted is a filter and isolating contactor circuit 122, shown separating the power stage 120 from a rest of an AC network for brevity, but which may include various components distributed throughout the control architecture 100 and a related grid.

In some instances, some of the depicted elements may not be referred to as constituent portions of the control architecture 100. For example, the control architecture 100 can interface with, rather than include a current controller 116, PWM or other modulation circuits, power stage 120, filter-contactor circuit 122 and transducer 124. Such a control architecture 100 may be configured to receive, from a user interface 130, various parameters to cause the control architecture 100 to operate with a particular inverter output system or other power conditioning system (e.g., including the current controller 116, PWM or other modulation circuits, power stage 120, filter-contactor circuit 122).

Figure 2:
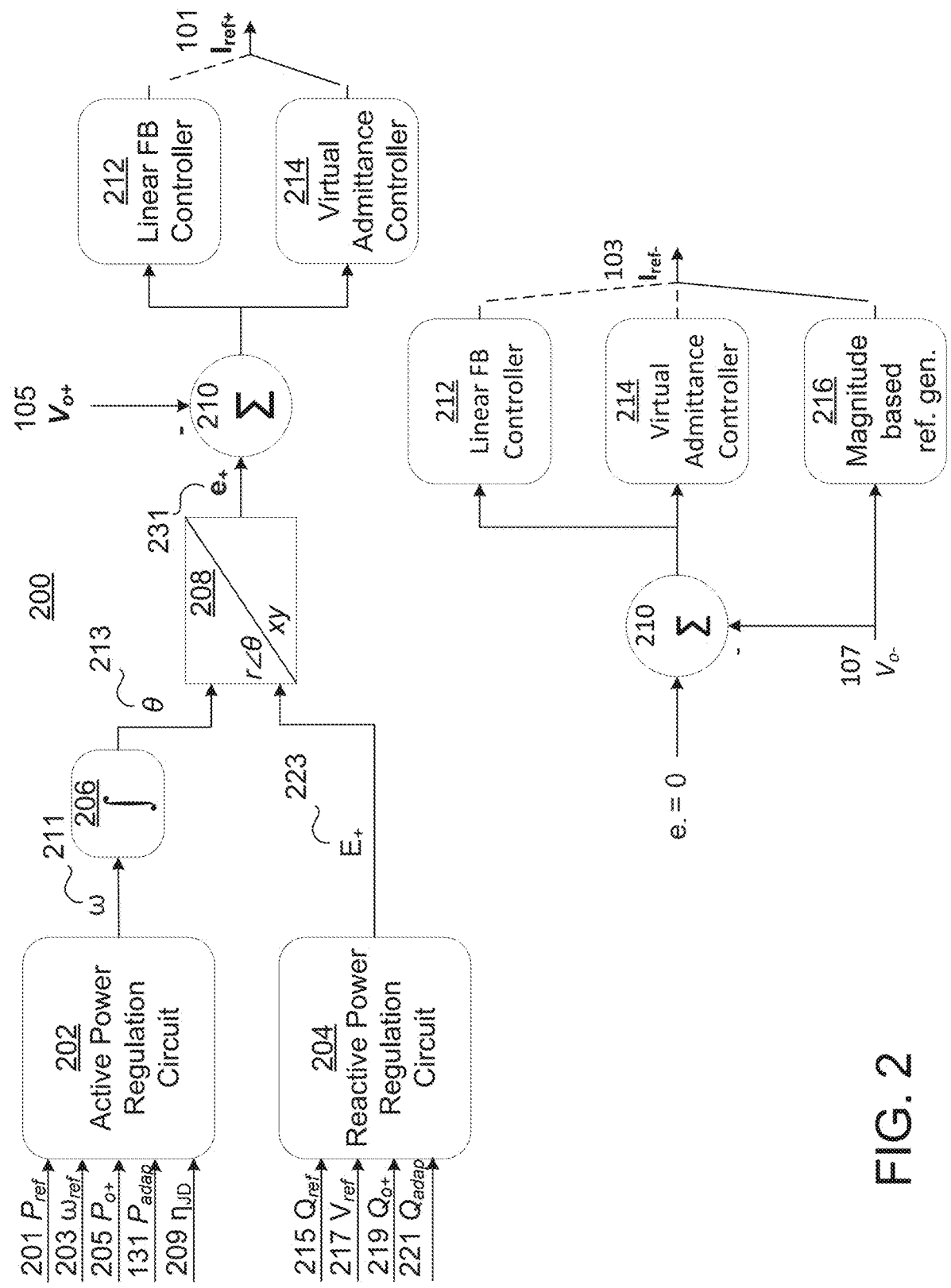
FIG. 2 depicts an example power synchronization model, according to an embodiment.

Referring now to FIG. 2, an example power synchronization model 102 is shown, according to an embodiment. Particularly, the illustrative example of the PSM 102 is implemented as a droop power synchronization model (dPSM) 200. In various embodiments, the dPSM 200 can be substituted for other implementations of the dPSM 200, or another PSM 102 model, such as a virtual synchronous machine implementation of a PSM 102. The dPSM 200 can implement a control schema for regulation of output current and voltage vectors of a grid (sometimes referred to as a control law, without limiting effect).

The dPSM 200 control schema includes an active power regulation circuit 202 to determine an angular frequency 211, $\omega$, as follows.

$$\omega = \omega_{ref} + \eta_{JD} \cdot m_P \cdot \left( \frac{\xi_P \cdot P_{ref} - P_{o+}}{\tau_P \cdot s + 1} - P_{adap} \right). \quad \text{EQ1}$$

The angular frequency 211, $\omega$, may be provided as an offset from a reference frequency 203, $\omega_{ref}$, for a grid or equipment related thereto (e.g., 50 Hz or 60 Hz for a grid, 300 Hz or 360 Hz for certain associated equipment such as rotating mechanical devices or certain inverters.). The remaining terms incorporate adaptation signals 114 from the model adapter 112, setpoints or other references, and control parameters. Any such terms may be, in various embodiments, integral to the model or adjustable/updateable (e.g., via the user interface). Further, in some embodiments, at least a portion of the terms may be omitted, such as where the model adapter 112 provides fewer or different adaptation signals. In the depicted example, terms shown at an input to the active power regulation circuit 202 include feedback and adjustable control parameters. The other terms may include updateable control parameters or parameters integral to a particular model, according to various embodiments.

More particularly, $m_P$ is a droop coefficient that sets how much the frequency can deviate with changes in active power. A positive value denotes a proportional droop coefficient. Such a coefficient may be provided prior to a further transform of capacity limits, which may be embedded in the various adaptation signals 114 received by the model adapter 112 or otherwise implemented in the control architecture 100 (e.g., by the capacity constrainer 106). $P_{ref}$ indicates an active (or real, without limiting effect) power reference 201 for the dPSM 200, which may be further modulated according to constraints as indicated with reference to the droop coefficient, $m_P$. $P_{o+}$ indicates positive-sequence active power output 205, which can include a measured or estimated value. In some operating conditions, the positive-sequence active power output 205 can attain a value at or substantially near the output capability of the power conversion system. In some operating conditions (e.g., a fault condition, wherein a device coupled with the control architecture 100 injects a negative-sequence current), the positive-sequence active power output 205 may substantially deviate from total or active power output. A time constant, $\tau_P$, is associated with the control to establish the speed at which the active power responds to changes, as a low pass filter time-constant. The Laplace operator is denoted by s in equation 1 (and throughout the present disclosure).

The dPSM 200 can receive the adaptation terms and scaling factors ($\eta_{JD}$ and $\xi_P$) as constituent portions of adaptation signals 114 from the model adapter 112. For example, the model adapter 112 can provide the scaling factors as attenuating signals (e.g., less than one) responsive to a determination that a deviation between commanded and predicted output power exists, or as a unity scaling signal during other times of operation. In some embodiments, the model adapter 112 can provide the scaling factors according to an attenuating or amplifying signal, and the dPSM 200 can include circuitry to clip any values exceeding unity gain. The adaptation signal received, by the dPSM 200 and from the model adapter 112 can further include an adaptation term for active-power and frequency dynamics 131, $P_{adap}$, which may be provided as any real number.

Upon determining the angular frequency 211, $\omega$, such a value may be integrated over time (via the accumulator 206) to determine a phase angle 213, $\theta$, of the positive-sequence internal control voltage angle reference. A cartesian transformer 208 can receive the phase angle 213 from the active power regulation circuit 202 and a positive-sequence internal control voltage magnitude reference 223, $E_+$ from a reactive power regulation circuit 204, to determine an instantaneous voltage reference vector 231, $e_+$.

A summing amplifier 210 can receive the instantaneous voltage reference vector and the positive-sequence voltage component 105, $v_{o+}$, to determine a difference therebetween (e.g., an error signal). The error signal may be smoothed, filtered, or otherwise processed to determine a positive-sequence symmetrical current reference 101 of an output current reference signal set 104. For example, the positive-sequence symmetrical current reference 101 may be selected to damp oscillations, limit deviations from reference signals, and otherwise maintain a formed grid. The dPSM 200 can include a (linear) feedback controller 212, such as a proportional-integral (PI), proportional-resonant (PR), proportional-integral-resonant (PIR), lead-lag (LL), or proportional-integral-derivative (PID) compensator. For example, a PI controller can operate in a rotating frame of reference and the PR controller can operate in a stationary frame of reference. The dPSM 200 can include a virtual admittance controller 214 to manage fluctuations of power delivery responsive to changes to a load or available sources. In some embodiments, the dPSM 200 can include multiple controllers for a weighted ensemble. In some embodiments, the dPSM 200 can include a switch control to select from the various controllers according to a configuration parameter (e.g., saved in a configuration file in a memory device of the control architecture 100 or received via the user interface 130).

The dPSM 200 includes a reactive power regulation circuit 204 to determine the positive-sequence internal control voltage magnitude reference 223, $E_+$, as follows:

$$E_+ = V_{ref} + m_Q\left(\frac{Q_{ref} - Q_o}{\tau_Q s + 1} - Q_{adap}\right). \quad \text{EQ2}$$

The positive-sequence internal control voltage magnitude reference 223 may be provided as an offset from a voltage magnitude reference 217, $V_{ref}$, of the dPSM 200. The remaining terms incorporate adaptation signals 114 from the model adapter 112, setpoints or other references, and control parameters. Any such terms may be, in various embodiments, integral to the model or adjustable/updateable (e.g., via the user interface 130). Further, at least a portion of the terms may be omitted, in some embodiments, such as where the model adapter 112 provides fewer or different adaptation signals 114, or is omitted (e.g., in combination with a capacity constrainer 106 implementing a deterministic model). In the depicted example, terms shown at an input to the reactive power regulation circuit 204 include feedback and adjustable control parameters. The other terms may include updateable control parameters or parameters integral to a particular model, according to various embodiments.

More particularly, $m_Q$ is a reactive power vs voltage droop coefficient indicating how much voltage can deviate with changes in reactive power. This term, and others provided hereinafter may be further modulated according to constraints as indicated with reference to the droop coefficient, $m_Q$. $Q_{ref}$ indicates a reactive (or imaginary, without limiting effect) power reference 215 for the dPSM 200. $Q_{o+}$ indicates positive reactive active power output 219, which can include a measured or estimated value. In some operating conditions, such power output 219, in combination with $P_{o+}$ can attain a value at or substantially near the output capability of the power conversion system, a proportion therebetween depending on a target power factor integral to a model or received as a configurable setting (e.g., from the user interface 130 or a memory device). For example, the dPSM 200 can adjust a power factor based to limit a change, or rate of change, of current delivered responsive to changing loads or generation availability.

A time constant, $\tau_Q$, is associated with the control to establish the speed at which the reactive power responds to changes, as a low pass filter time constant. The time constant may be shared or separate from the time constant of equation 1, in various embodiments. Once again, s depicts the Laplace operator. The dPSM 200 can receive an adaptation signal 114 from the model adapter 112 including an adaptation term for reactive-power and voltage dynamics 221, $Q_{adap}$, which may be provided as any real number.

The dPSM 200 can determine a negative-sequence symmetrical current reference 103 similarly to the negative-sequence symmetrical current reference 103, based on a negative-sequence voltage component 107 rather than the positive-sequence voltage component 105. In some embodiments, the negative sequence portion of the absolute instantaneous voltage reference vector 231 can be assumed as zero, further simplifying operations (e.g., the depicted summing amplifier receiving the negative-sequence voltage component 107 can be omitted or simplified). The depicted dPSM 200 can include any feedback controller 212 or admittance controller 214, or combination thereof. In some embodiments, the dPSM 200 can include a magnitude-based reference generator 216, to implement pre-set linear, piecewise linear, or nonlinear rules based on a measured or estimated indicia of the negative-sequence voltage component 107. For example, such a controller may be implemented via a LUT. A summing amplifier 210 can generate an error signal corresponding to the negative-sequence voltage component 107, based on a predefined negative-sequence voltage reference (e.g., zero). That is, the dPSM 200 may be configured to reduce injection of negative sequence towards zero during at least some operational states. However, controls implemented by the various controllers 212, 214, 216 can permit negative-sequence injection during transient conditions.

As for the positive-sequence symmetrical current reference 101, the dPSM 200 can generate the negative-sequence symmetrical current reference 103 based on a selection or combination of one or more of the controllers, and may further be selectable based on a configuration setting, feedback, etc. A presence or control parameter of the controllers can be substantially symmetrical or can vary between the positive-sequence symmetrical current reference 101 and the negative-sequence symmetrical current reference 103, or between various embodiments, modes of operation, feedback iterations, or so forth.

Figure 3:
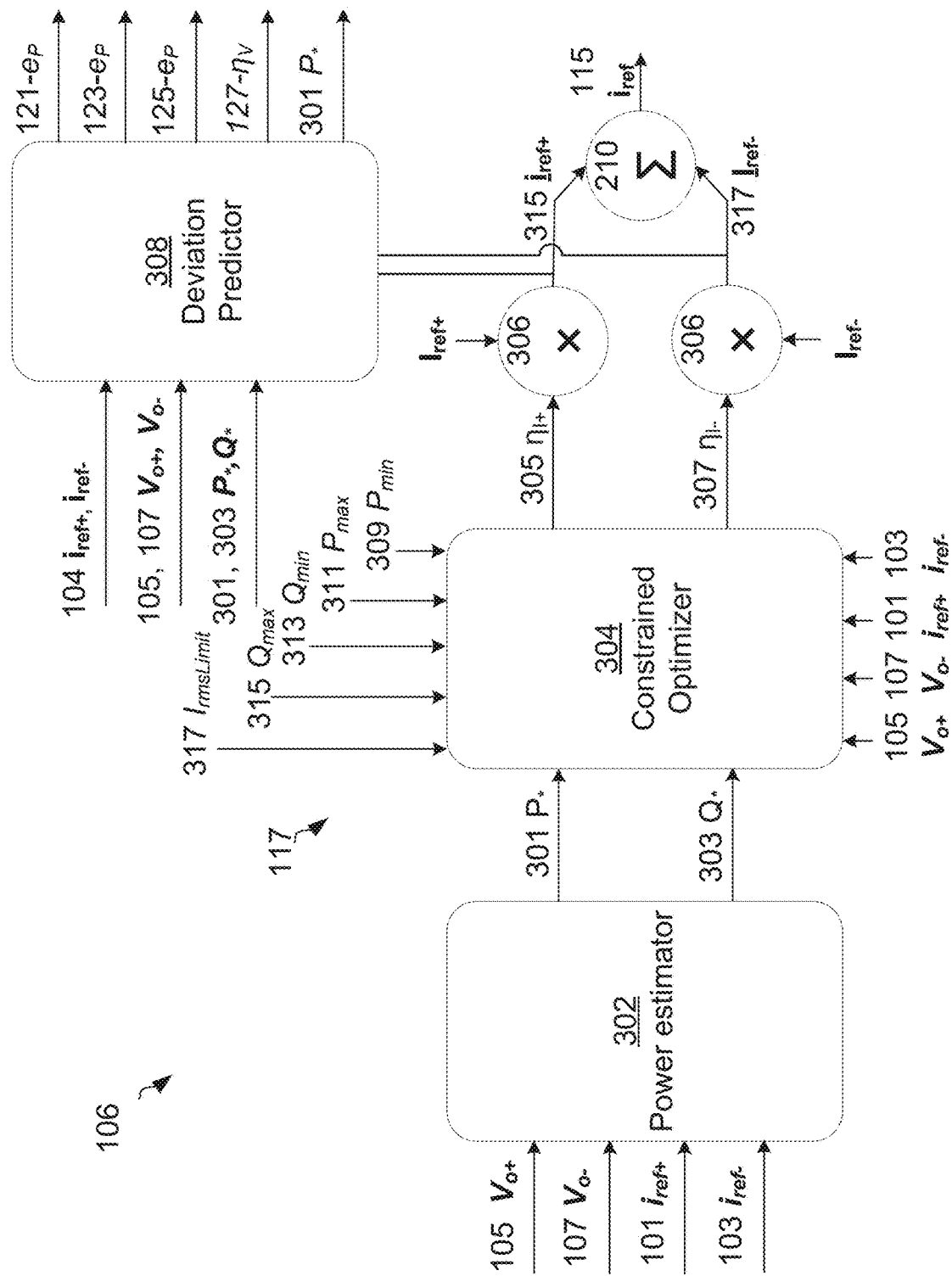
FIG. 3 depicts an example capacity-constraint enforcement model, according to an embodiment.

Referring now to FIG. 3, an example capacity constrainer 106 is shown, according to an embodiment. The capacity constrainer 106 can generate a combined current reference 115 based on indicia of an output voltage or current, control parameters, and the current references 104 received from the PSM 102 (e.g., the dPSM 200 of FIG. 2 or another PSM 102). The commanded active power 301 and commanded reactive power 303 can further depend on the measured or estimated state of the output of the power stage 120, such as according to a positive-sequence voltage component 105, and a negative-sequence voltage component 107.

A power estimator 302 of the capacity constrainer 106 can determine, based on the combined current references 104 received from the PSM 102, a commanded active power 301, $P_*$ and commanded reactive power 303, $Q_*$. The commanded active power 301 and commanded reactive power 303 can further depend on the measured or estimated state of the output of the power stage 120, such as according to a positive-sequence voltage component 105, and a negative-sequence voltage component 107. The determination of the commanded power 301, 303, by the power estimator 302, may include variance from an actual commanded amount and, accordingly, may be referred to as a prediction or estimation, without limiting effect. That is, the commanded active power 301 may be referred to as an estimated commanded active power, determined commanded active power 301, or predicted commanded active power 301. The capacity constrainer 106 can resolve or reduce an expected deviation from the commanded power 301, 303 according to a response of the control architecture 100 addressing transient or other anomalous behavior in response to the capacity constrainer 106 outputs.

The power estimator 302 can provide the commanded active power 301 and commanded reactive power 303 to a constrained optimizer 304, for ingestion thereby. The constrained optimizer 304 can determine a set of complex gains, $\eta_I$, which may include a positive-sequence component 305, $\eta_{I+}$, and a negative-sequence component 307 $\eta_{I-}$. The constrained optimizer 304 can determine the complex gains, $\eta_I$, based on a capacity limit term 117, such as a minimum active power 309, $P_{min}$, a maximum active power 311, $P_{max}$, a minimum reactive power 313, $Q_{min}$, a maximum reactive power 315, $Q_{max}$, or a maximum or minimum limit for current magnitude 317 (e.g., a limit for root-means squared current, $I_{rmsLimit}$ for one or more phases).

The constrained optimizer 304 can determine the set of complex gains according to a solution to a constrained optimization problem (discussed in further detail below). The solution can be referred to as an optimum which, as used herein, can refer to either a locally or globally optimized value. That is, the capacity constrainer 106 can converge upon a local optimum which may be or differ from a global optimum, either of which may be referred to as an optimization, optimal value, optimal solution, solution or the like. The constrained optimizer 304 can apply the solution to at least one current reference 104, such as the positive-sequence symmetrical current reference 101, or a negative-sequence symmetrical current reference 103. The solution of the constrained optimizer 304 may be used, by the capacity constrainer 106, to scale the current references 104 in a complex plane to generate a positive scaled current reference 319, $i_{ref+}$, as scaled to a positive-sequence symmetrical current reference 101 and a negative scaled current reference 321 $i_{ref-}$, as scaled to a negative-sequence symmetrical current reference 103, via separate multipliers 306 for the respective components as follows:

$$\begin{bmatrix} i_{-ref+} \\ i_{-ref-} \end{bmatrix} = \begin{bmatrix} \eta_{I+} i_{ref+} \\ \eta_{I-} i_{ref-} \end{bmatrix} \quad \text{EQ3}$$

A summing amplifier 210 can receive the scaled current references 319, 321 to generate the combined current reference 115 for provision to the current controller 116 to actuate the power stage 120 associated with the control architecture 100.

A deviation predictor 308 may also receive the scaled current references 319, 321, along with the unscaled current references 104, from the PSM 102. The deviation predictor 308 can determine a deviation between a commanded and generated output voltage vector or output current vector. For example, the deviation predictor 308 can receive a (measured or estimated) decomposed positive- and negative-sequence symmetrical components 108 and commanded active power 301 and reactive power 303 to determine a difference between an expected power generation (e.g., according to a difference between a power provided according to the scaled current references 319, 321 and unscaled current references 104). The deviations may be provided to the model adapter 112, which may generate an adaptation signal 114 for provision to the PSM 102 based on the indicia of deviation 118. The provision may cause the PSM 102 to iteratively adjust an output towards an optimal (e.g., locally optimal) deviation. For example, a duration, magnitude, or other aspect of a deviation (of a phase, voltage, current, real or reactive power, or component thereof) may be optimized for, or a combination thereof according to a defined weighting.

The capacity constrainer 106 can use any of various models or variations thereof to determine the deviations. The models may vary according to control processor computational ability of the control architecture 100. The models may vary according to an availability, latency, resolution, or accuracy of estimated or measured predictions. The models may vary according to a mode of operation. The models may vary according to an expected dynamic range or other expected behavior of inverters of the control architecture 100 or any associated grid devices. The associated grid devices can include energy sinks and sources (e.g., grid following sources). The capacity constrainer 106 can operate based on parameters of associated grid devices such as expected fault behavior, or other attributes such as variable sources including renewable energy sources or gensets.

Figure 4:
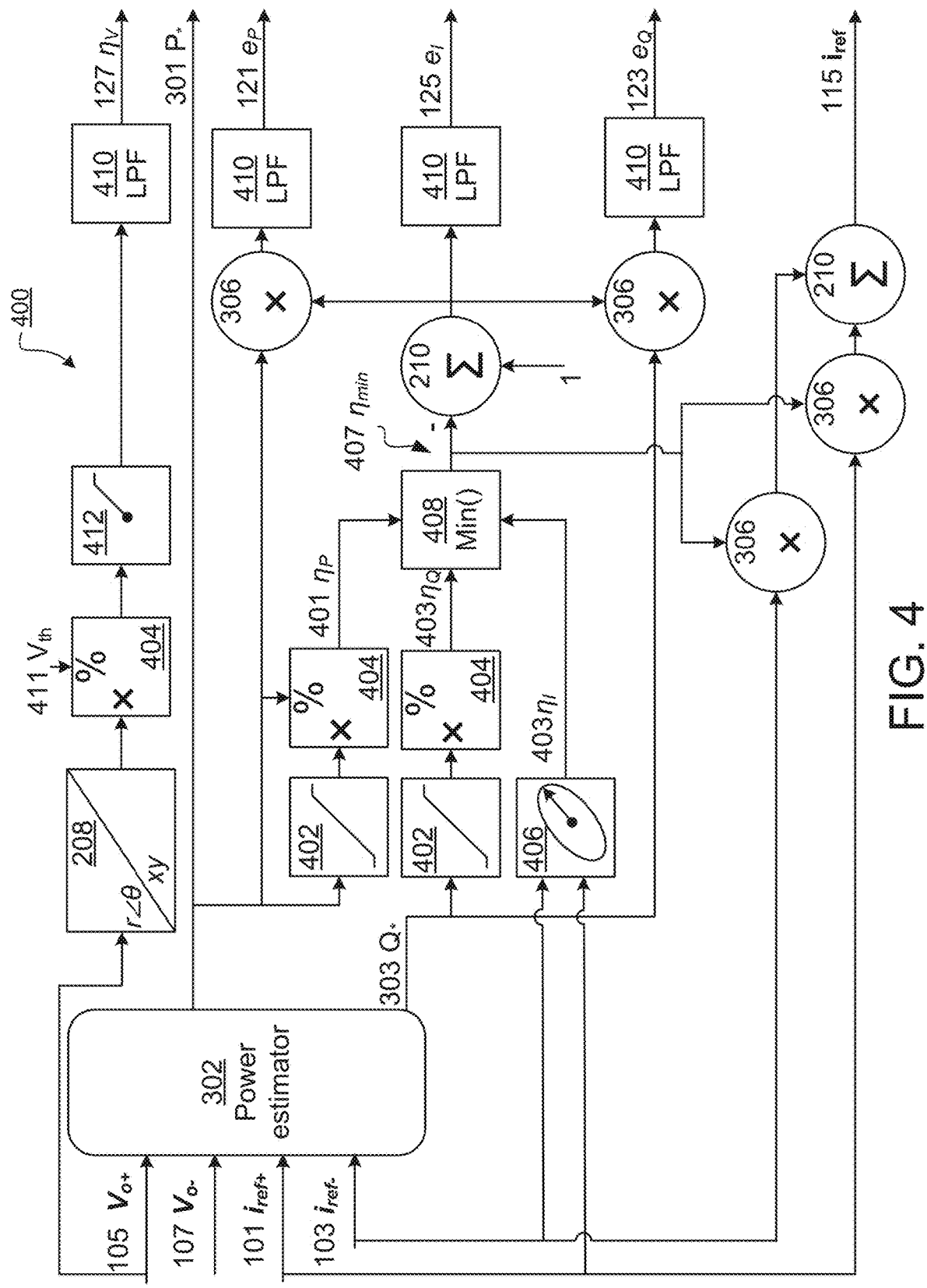
FIG. 4 depicts an example capacity-constraint enforcement model, according to an embodiment.

Before proceeding to the simplified example at FIG. 4, a more general constrained optimization problem is provided as according to a sum of squares example. The constraint can refer to a concentration of, for example, a capacity limit of an associated power source, power inverter, or specified according to an interconnection agreement or other operating constraint. In various embodiments, other approaches may be used, such as the illustrative examples of maximum error optimization (minmax), Huber loss, log loss, Cross-Entropy, or mean absolute percent error (MAPE). Indeed, according to various embodiments of the present disclosure, the capacity constrainer 106 can use the illustrative example of FIG. 4, or any other solution to the constrained optimization problem, which may vary, as indicated above, according to various implementations. An output power attributed to the scaled references at the output voltage and current can be provided as a function of the decomposed sequence symmetrical components 108 and the unscaled current references 104 scaled by the scaling gains (which may include attenuating, amplification, or unity gains). Such a power may be further disaggregated into an active and reactive component. That is, constrained output power Pc and Qc may be provided as:

$$P_C(v_{o+}, v_{o-}, \eta_{I+} \cdot i_{ref+}, \eta_{I-} \cdot i_{ref-}); \quad \text{EQ4}$$

$$Q_C(v_{o+}, v_{o-}, \eta_{I+} \cdot i_{ref+}, \eta_{1-} \cdot i_{ref-}). \quad \text{EQ5}$$

The constrained optimization problem follows as a minimum (e.g., local minimum or global minimum) of a cost function, where the commanded active power, commanded reactive power, and any of the costs are non-negative. The cost function is sometimes referred to as an error function or objective function, where the costs may be alternatively referred to as, for example, error terms, or squared error terms, without limiting effect. The cost function is provided as:

$$\omega_P(P_C - P*)^2 + \omega_Q(Q_C - Q*)^2 + \sum_{n=1}^{7} \omega_n(\epsilon_n)^2 \quad \text{EQ6}$$

where an active power weight, $\omega_P$ weights a deviation between constrained and commanded active power 301. Similarly, a reactive power weight, $\omega_Q$, weights a deviation between constrained and commanded reactive power 303. A same or different weight, $\omega_n$ is provided for each of various inequality constraints of constraint functions provided as follows, which constrain the cost function of EQ6:

$$P_c - P_{max} \leq \epsilon_1 \quad \text{EQ7}$$

$$P_{min} - P_C \leq \epsilon_2 \quad \text{EQ8}$$

$$Q_c - Q_{max} \leq \epsilon_3 \quad \text{EQ9}$$

$$Q_{min} - Q_C \leq \epsilon_4 \quad \text{EQ10}$$

$$I_{a,rms} - I_{rmsLimit} \leq \epsilon_5 \quad \text{EQ10}$$

$$I_{b,rms} - I_{rmsLimit} \leq \epsilon_6 \quad \text{EQ11}$$

$$I_{c,rms} - I_{rmsLimit} \leq \epsilon_7 \quad \text{EQ12}$$

The weights may be selected according to a priority, such as a priority of active power over reactive power, or vice versa, when a capacity limit is reached. In some embodiments, the priority may be multi-factorial or weighted.

The root-mean-squared (rms) values for each of the phases are provided as follows (where the phases are phase shifted by 120° according to the complex exponential):

$$I_{a,rms} = \sqrt{0.5\left(|\eta_{I+}i_{ref+}|^2 + |\eta_{I-}i_{ref-}|^2 + 2\text{Re}(\eta_{I+}i_{ref+}\eta_{I-}i_{ref-})\right)} \quad \text{EQ13}$$

$$I_{b,rms} = \sqrt{0.5\left(|\eta_{I+}i_{ref+}|^2 + |\eta_{I-}i_{ref-}|^2 + 2\text{Re}\left(\eta_{I+}i_{ref+}\eta_{I-}i_{ref-}e^{\frac{j4\pi}{3}}\right)\right)} \quad \text{EQ14}$$

$$I_{c,rms} = \sqrt{0.5\left(|\eta_{I+}i_{ref+}|^2 + |\eta_{I-}i_{ref-}|^2 + 2\text{Re}\left(\eta_{I+}i_{ref+}\eta_{I-}i_{ref-}e^{\frac{j2\pi}{3}}\right)\right)} \quad \text{EQ15}$$

In some embodiments, additional or different terms may be used in the constrained optimization problem (e.g., neutral line currents). In some embodiments, fewer terms may be used to reduce computational burden used to resolve the constrained optimization problem. For example, the negative sequence current reference 103 may be kept unaltered or a rule-based scalar gain, $\eta_{I-}$, can be used in the negative sequence. In some embodiments, any of the commanded powers may be based on consideration of a positive-sequence alone, which may reduce computational effort. Such substitution may not substantially deviate from a more complete computation, particularly where, in a functional grid, the positive terms dominate any injected negative current. That is, for the purposes of solving the optimization problem alone, $P_{*+}$ and $Q_{*+}$ may be substituted for $P_*$ and $Q_*$. In some embodiments, the capacity-constrained powers may be similarly substituted, calculating based on $P_{c+}$ and $Q_{c+}$, rather than $P_c$ and $Q_c$. One such optimized example is provided henceforth.

Referring now to FIG. 4, an example capacity-constraint enforcement model 400 is shown, according to an embodiment. The depicted enforcement model 400 limits the solution to scalar and equal values, such that $\eta_{I+}=\eta_{I-}=\eta_{min}$ 407. Further, only the positive sequence power is considered, for a deterministic solution.

A power estimator 302 can determine (e.g., estimate, predict) a commanded active power 301 and commanded reactive power 303 as described with reference to the capacity constrainer 106 of FIG. 3, but may be based on positive sequences alone to reduce computational complexity (e.g., to achieve determinism). A separate limiter, such as a two-sided limiter 402, can limit the commanded (active and reactive) power 301, 303 according to a saturation limit (e.g., $P_{min}$ and $P_{max}$ for the commanded active power, and $Q_{min}$ and $Q_{max}$ for the commanded reactive power). Any of the limiters can include look ahead limiters or near-real-time limiters. Respective dividers 404 can receive an output of the limiters to determine a ratio between the commanded (active and reactive) power 301, 303, and a saturated output of the limiters. The output of the dividers 404 can be referred to as an active saturation ratio 401, $\eta_P$, for active power and reactive saturation ratio 403, $\eta_Q$, for reactive power.

Another limiter, such as a soft limiter (e.g., elliptical limiter 406), can receive the current reference vectors 104. This limiter can determine, based on the current reference vectors 104, a scaling value 405, $\eta_I$ for the current reference. To determine the scaling value 405, the limiter can determine an RMS value for the various phases, assuming a same frequency between the positive and negative sequence vectors as follows:

$$I_{a,rms} = \sqrt{0.5 \left( |i_{ref+}|^2 + |i_{ref-}|^2 + 2\mathrm{Re}\left( i_{ref+} i_{ref-} \right) \right)} \quad \text{EQ16}$$

$$I_{b,rms} = \sqrt{0.5 \left( |i_{ref+}|^2 + |i_{ref-}|^2 + 2\mathrm{Re}\left( i_{ref+} i_{ref-} e^{\frac{j4\pi}{3}} \right) \right)} \quad \text{EQ17}$$

$$I_{c,rms} = \sqrt{0.5 \left( |i_{ref+}|^2 + |i_{ref-}|^2 + 2\mathrm{Re}\left( i_{ref+} i_{ref-} e^{\frac{j2\pi}{3}} \right) \right)} \quad \text{EQ18}$$

The limiter can select a maximum current from the phases ($I_{rmsMax}$) to compare to a current limit, $I_{rmsLimit}$. Where the maximum currents of equations 16, 17, or 18 exceed the current magnitude limit, the limiter can use a divider 404 to determine a ratio therebetween, as the scaling value 405. Where the maximum current does not exceed the limit, the limiter can operate in a linear range (e.g., bypass mode) such as by outputting a 1, an enable_not signal, or so forth.

A MinSelector 408 can receive each of the active saturation ratio 401, reactive saturation ratio 403, and scaling value 405. The MinSelector 408 can select a minimum of the received values to determine a minimum scaling ratio 407, $\eta_{min}$. The minimum scaling ratio 407 is applied to a multiplier 306 to scale each of the current reference vectors 104, which are, in turn received by a summing amplifier 210 to generate a combined current reference vector 115.

The scaling value 405 can be provided as a normalized scaled value for current magnitude. For example, the summing amplifier can determine a compliment thereof:

$$e_I = (1 - \eta_I).$$

The active saturation ratio 401 can be used to estimate a deviation in active power as follows:

$$e_P = (1 - \eta_P) P*.$$

The reactive saturation ratio 403 can be used to estimate a deviation in reactive power as follows:

$$e_Q = (1 - \eta_Q) Q*.$$

In some embodiments, a slew limiter, such as a low pass filter 410, may be applied to the outputs, which may aid an underdamped control architecture 100 or otherwise aid transient ride-through. The slew limiters may be included to control a rate of change of further outputs of the expected deviation from commanded active power 121, expected deviation from commanded reactive power 123, expected deviation from commanded current magnitude 125, or deviation of positive sequence output voltage magnitude 127.

Any of the active saturation ratio 401, reactive saturation ratio 403 or scaling value 405 (or combinations thereof) can be referred to as an expected or predicted deviation/error from a corresponding commanded value. The capacity constrainer 106 can provide any of these values to the model adapter 112 as a part of the adaptation signal 114. The capacity constrainer 106 can further include, in the adaptation signal 114, the commanded real power 301 and a normalized positive sequence output voltage magnitude 127, for use by the model adapter 112.

With further reference to normalized positive sequence output voltage magnitude 127, a cartesian transformer 208 can receive a positive-sequence voltage component 105 and determine a magnitude thereof, which may be scaled relative to a voltage threshold value 411, Vth. The voltage threshold value 411 may be received from a user interface 130, integral to a program, or determined based on a state of a grid or component (e.g., grid forming inverter) thereof. Such a value may be limited by a magnitude limiter 412 (e.g., to provide a measured or constrained value), and provided on to the model adapter 112 (with or without a transform applied by a low pass filter 410, as described above).

Figure 5:
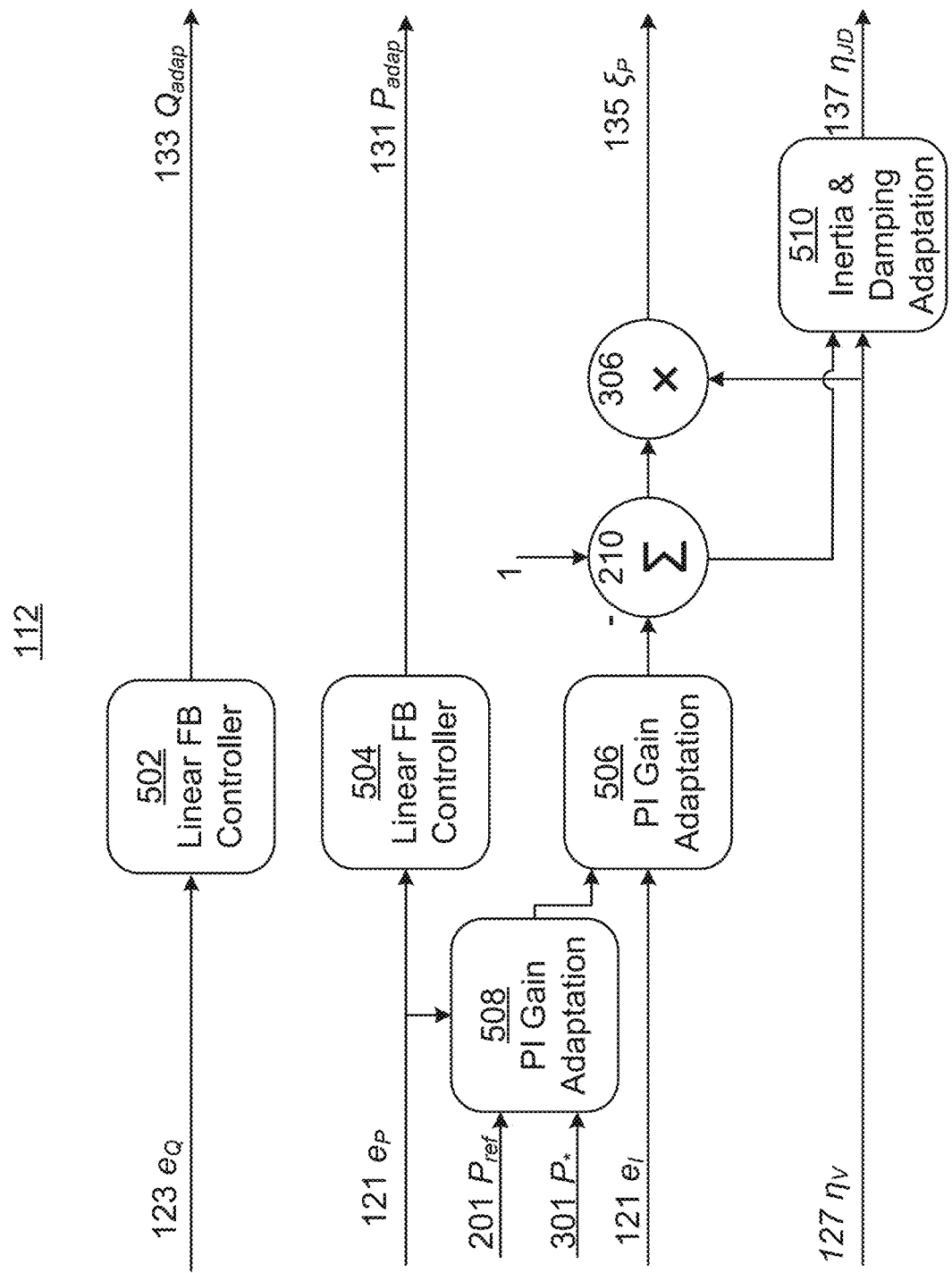
FIG. 5 depicts an example model adjustment block, according to an embodiment.

Referring now to FIG. 5, an example model adapter 112 is shown, according to an embodiment. The model adapter 112 is configured to generate adaptation signals 114 to adjust power regulation (of active and reactive power) of the PSM 102. In some embodiments, the model adapter 112 can pass indicia of deviations 118 directly from the capacity constrainer 106 to the PSM 102, or according to a predefined transform (e.g., a LUT). In some embodiments, the model adapter 112 includes controllers (e.g., linear feedback controllers, such as PI controllers) to generate the adaptation signals 114. For example, a first PI controller 502 can determine an adaptation term for reactive-power and voltage dynamics 133 based on an expected deviation from commanded reactive power 123. A second PI controller 504 can determine an adaptation term for active-power and frequency dynamics 131 based on an expected deviation from commanded active power 121.

A third PI controller 506 can ingest an expected deviation from commanded current magnitude 125 to determine a scaling factor 135 for a power reference of the PSM 102. For example, the model adapter 112 can scale an output of the third PI controller 506 with the deviation of positive sequence output voltage magnitude 127 (e.g., scaled from a complement by using a summing amplifier 210 to determine the complement). In some embodiments, a gain-scheduler or a predefined-transform (e.g., a LUT) 508 may be used to adapt the parameters and/or inputs to the third PI controller 506 according to a condition of the active power. Particularly, the gain-scheduler or a predefined-transform 508 can contribute to the third PI controller 506 according to the active power reference 201, commanded active power 301, and expected deviation from commanded reactive power 123. Where the gain-scheduler or a predefined-transform 508 is omitted, the expected deviation from commanded active power 121 may be a sole input of the third PI controller 506.

The model adapter 112 determines a scaling factor 137 for a droop coefficient of a droop-based PSM 102 based on the deviation of positive sequence output voltage magnitude 127, and the compliment of the output of the third PI controller 506. For example, an inertia and damping adapter circuit 510 can provide a virtual inertia to mimic or improve upon traditional synchronous generator operation. The inertia and damping adapter circuit 510 can further damp oscillations to settle the control architecture 100 to steady state operation upon realizing an oscillatory disturbance, without overdamping to exceed control capacity or overshoot.

References to PI controller herein should not be construed as limiting. Indeed, in some embodiments, the various depicted controllers can be substituted for a multiple input-multiple-output controller, or other circuitry configured to apply a transform function to indicia of deviations 118 to generate the adaptation signals 114 adapted for receipt by the PSM 102. Control parameters of such a controller (or at least the proportional and integral gains of the depicted controllers) can be integral to a model or adjustable/updatable, such as via the user interface.

FIG. 6 is a flow chart of an implementation of a method 600 for controlling grid-forming inverters in an electrical grid, according to an embodiment. The method 600 may be performed by individual devices within a control architecture, such as by one more processors (e.g., discrete processing circuits or processors configured to execute instructions to perform operations). For example, the method may be performed by the components of the control architecture 100 of FIG. 1. The method 600 may include any number of operations and the operations may be performed in any order. For example, operations 605, 610, and 615 may be omitted, substituted, or supplemented according to the various embodiments of the present disclosure, or additional operations can be included.

At operation 605, one or more processors of the control architecture receives a measured or estimated output current vector or output voltage vector, and decomposes the received vectors into positive-sequence symmetrical components and negative-sequence symmetrical components. For example, the one or more processors can receive $v_o$ and $i_o$ generate the decomposed sequence symmetrical components 108 as described with regard to the symmetrical component extractor 110, above.

At operation 610, one or more processors of the control architecture can generate, based on the decomposed positive-sequence symmetrical components and negative sequence symmetrical components, symmetrical current references. For example, the one or more processors can generate current references 104 as described above with regard to the PSM 102.

At operation 615, one or more processors of the control architecture can adjust a combined current reference for a power stage of the grid-forming inverters responsive to determining that the symmetrical current references violate at least one of a plurality of capacity limits. For example, the capacity constrainer 106 can ingest capacity limit terms 117, and current references 104. The capacity constrainer 106 can determine, based on the capacity limit terms 117, and current references 104, that a commanded output (active or reactive) power or other output is not realizable according to the control architecture and any associated devices, and may adjust the combined current reference (e.g., the combined current reference 115 described above) to reduce a variation between the commanded and expected output. For example, the output can include active power, reactive power, or current magnitude.

In some embodiments, the one or more processors can execute the method iteratively, predicting iterative deviations between commanded and expected values according to adaptation terms or other signals of an adaptation signals provided responsive to the detected deviation. For example, the one or more processors can generate a first deviation between commanded and expected values, a first adaptation signal based on the first deviation, a second deviation between commanded and expected values; a generating second adaptation signal based on the second deviation, and so on. The adaptation signals can include, any of the components discussed with regard to the adaptation signals 114 above. For example, the adaptation signal can include a first adaptation term for active power based on frequency information, a second adaptation term for reactive power based on voltage information, a scaling factor for active power, and a scaling factor for reactive power (e.g., $P_{adap}$ 131, $Q_{adap}$ 133, $\xi_P$ 135, or $\eta_{JD}$ 137).

In some embodiments, the one or more processors can execute the method deterministically (in combination with the iterative execution or separate therefrom). For example, the one or more processors of the control architecture can predict a deviation between commanded and expected values according to a deterministic model. Based on the prediction, the one or more processors can provide an updated combined current reference to a current controller for a power stage of grid-forming inverters or other converters, or power conversion devices.

Figure 7:
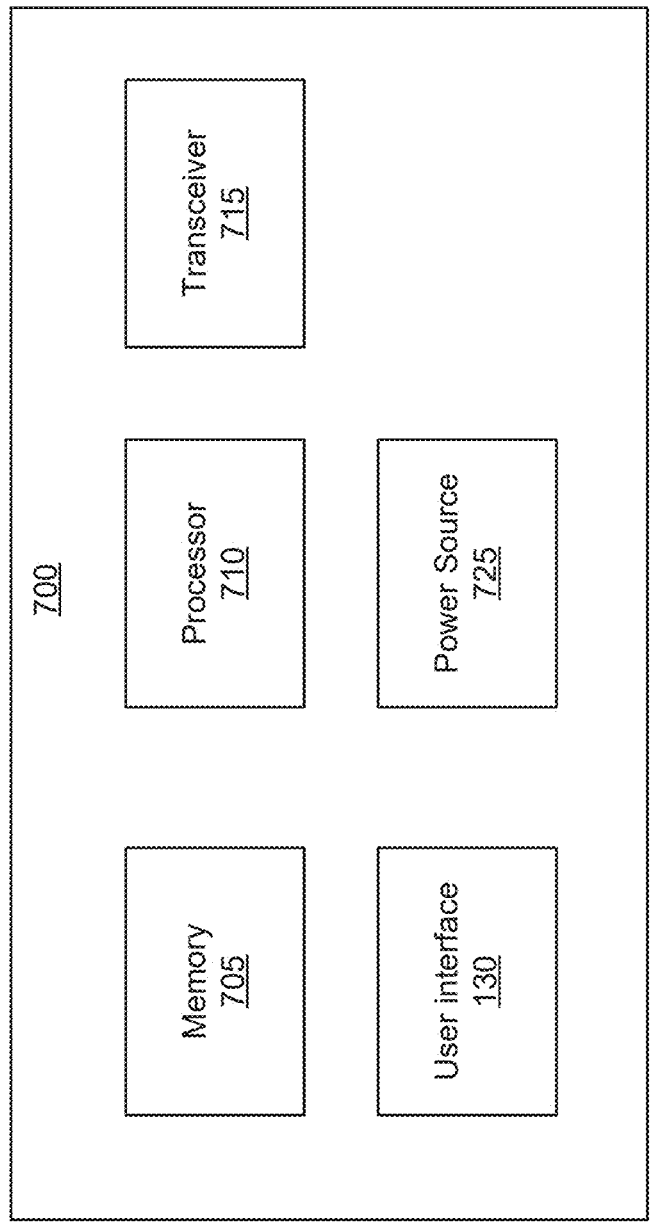
FIG. 7 depicts an example computing device, according to an embodiment.

FIG. 7 is a block diagram of a computing device 700 in accordance with an illustrative embodiment. An illustrative computing device 700 includes a memory 705, a processor 710, a transceiver 715, a user interface 130, and a power source 725. In alternative embodiments, additional, fewer, and/or different elements may be used.

Various circuits of the processor 710 can implement any of the structure or functionality described herein. For example, a computing device can include analog or digital circuitry to realize the structures described herein, or implement the structures according to instructions (software) stored in a non-volatile memory. The circuitry can include discrete application specific circuits, such as a discrete circuit of a summing amplifier 210, divider 404, multiplier 306, limiter, or so forth, in some embodiments. In some embodiments, a first subset of the computing device may be implemented according to instructions stored in a non-transitive memory device accessible to a general purpose processor 710 or programmable logic controller, with select functionality implemented according to a dedicated circuit, wherein such a processor may be referred to as a hardware-accelerated processer 710. Any of the depicted controllers or components other components herein, may include one or more processors, or can be implemented according to an execution of one or more processors. For example, the capacity constrainer 106 and model adapter 112 can be implemented by one or more processors, different processors, or multiple processors.

In an illustrative embodiment, the memory 705 is an electronic holding place or storage for information so that the information can be accessed by the processor 710. The memory 705 can include, but is not limited to, any type of random access memory (RAM), any type of read only memory (ROM), any type of flash memory, etc. such as magnetic storage devices (e.g., a hard disk), optical disks (e.g., compact disk (CD), digital versatile disk (DVD), etc.), smart cards, flash memory devices, etc. The computing device 700 may have one or more computer-readable media that use the same or a different memory media technology. The computing device 700 may have one or more drives that support the loading of a memory medium such as a CD, a DVD, a flash memory card, etc.

In an illustrative embodiment, the processor 710 includes circuits to execute instructions. The instructions may be carried out by a special purpose computer, logic circuits, or hardware circuits. The processor 710 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processor 710 executes an instruction, meaning that it performs the operations called for by that instruction. The processor 710 operably couples with the user interface 130, the transceiver 715, the memory 705, etc. to receive, to send, and to process information and to control the operations of the computing device 700. The processor 710 may retrieve a set of instructions from a permanent memory device such as a ROM device and copy the instructions in an executable form to a temporary memory device that is generally some form of RAM. An illustrative computing device 700 may include a plurality of processors 710 that use the same or a different processing technology. In an illustrative embodiment, the instructions may be stored in memory 705.

In an illustrative embodiment, the transceiver 715 is configured to receive and/or transmit information. In some embodiments, the transceiver 715 communicates information via a wired connection, such as an Ethernet connection, one or more twisted pair wires, coaxial cables, fiber optic cables, etc. In some embodiments, a transceiver 715 can convey information encoded in a power signal, such as a fault indication encoded in a negative sequence component of a three-phase power signal. In some embodiments, the control architecture 100 can include distributed components communicatively coupled via one or more transceivers 715 or communicatively coupled with various grid devices, sensors-transducer 124, instances of a user interface 130, or other components via the transceiver 715. In some embodiments, the transceiver 715 communicates information via a wireless connection using microwaves, infrared waves, radio waves, spread spectrum technologies, satellites, etc. The transceiver 715 can be configured to communicate with another device using cellular networks, local area networks, wide area networks, the Internet, the grid power signal, etc. In some embodiments, one or more of the elements of the computing device 700 communicate via wired or wireless communications. In some embodiments, the transceiver 715 provides an interface for presenting information from the computing device 700 to external systems, users, or memory. For example, the transceiver 715 may include an interface to a display, a printer, a speaker, etc. In an illustrative embodiment, the transceiver 715 may include alarm/indicator lights, a network interface, a disk drive, a computer memory device, etc. In an illustrative embodiment, the transceiver 715 can receive information from external systems, users, memory, etc.

In an illustrative embodiment, the user interface 130 is configured to receive and/or provide information from/to a user. The user interface 130 can be any suitable user interface. The user interface 130 can be an interface for receiving user input and/or machine instructions for entry into the computing device 700. The user interface 130 may use various input technologies including, but not limited to, a keyboard, a stylus and/or touch screen, a mouse, a track ball, a keypad, a microphone, voice recognition, motion recognition, disk drives, remote controllers, one or more buttons, dials, joysticks, etc. to allow an external source, such as a user, to enter information into the computing device 700. In some embodiments, the user interface includes an input port to receive parameters, models, or other instructions from a user. For example, the input port can cause ingested data to be stored in the memory device 705 for subsequent retrieval and execution by at least one circuit of the processor 710. In some embodiments, the user interface 130 can be used to navigate menus, adjust options, adjust settings, adjust display, etc.

The user interface 130 can be configured to provide an interface for presenting information from the computing device 700 to external systems, users, memory, etc. For example, the user interface 130 can include an interface for a display, a printer, a speaker, alarm/indicator lights, a network interface, a disk drive, a computer memory device, etc. The user interface 130 can include a color display, a cathode-ray tube (CRT), a liquid crystal display (LCD), a plasma display, an organic light-emitting diode (OLED) display, etc.

In an illustrative embodiment, the power source 725 is configured to provide electrical power to one or more elements of the computing device 700. In some embodiments, the power source 725 includes an alternating power source, such as available line voltage (e.g., 120 Volts alternating current at 60 Hertz in the United States). The power source 725 can include one or more transformers, rectifiers, etc. to convert electrical power into power useable by the one or more elements of the computing device 700, such as 1.5 Volts, 8 Volts, 12 Volts, 24 Volts, etc. The power source 725 can include one or more batteries. In various embodiments, the power source 725 may be isolated from or associated with (e.g., derived from) a grid formed according to the control architecture (e.g., by inverters of or interfacing therewith).

In one aspect, the present disclosure describes a capacity-optimized alternating current (AC) grid-forming controller for power electronics converters. The controller includes a power-synchronization model (PSM). The PSM is configured to receive positive- and negative-sequence symmetrical components of an output voltage and an output current. The PSM is configured to generate a plurality of current references comprising a positive-sequence current reference and a negative-sequence current reference. The PSM is configured to generate an internal voltage phase reference and voltage magnitude reference. The controller includes a capacity constrainer. The capacity constrainer is configured to determine, based on the plurality of references and a plurality of capacity limit terms, that a device coupled with the grid-forming controller is capacity constrained. The capacity constrainer is configured to determine optimum complex gains to scale control signals such as the plurality of current references based on the plurality of capacity limit terms. Indeed, references to the current references, like other illustrative examples of the present disclosure need to limit the contemplated embodiments. For example, the current references can be substituted for voltage references, frequency references, active or reactive power references, or so on. The capacity constrainer is configured to, responsive to the determination that the grid-forming controller is capacity constrained, output scaled current reference to cause a power stage for the grid-forming controller to adjust the output voltage or the output current, the scaled current reference scaled according to the complex gains.

In some embodiments of the controller, a first subset of components of the output voltage and the output current are measured at the power stage for the grid-forming controller. For example, the controller can include or interface with sensor-transducers to detect components of a voltage output vector and current output vector. The power-synchronization model may be configured to estimate a second subset of components of the output voltage and the output current based on the first subset of components. In some embodiments, the output voltage and the output current are measured at the power stage for the grid-forming controller (e.g., by the sensor-transducers of or associated with the controller). In some embodiments, the PSM includes a virtual synchronous machine model. The virtual synchronous machine model may be configured to generate a voltage phase reference and the voltage magnitude reference. The virtual synchronous machine model may be configured to generate the plurality of current references using the voltage phase reference and the voltage magnitude reference. In some embodiments, the PSM is configured to generate a voltage phase reference by drooping frequency with a first component of a positive-sequence output component, and generate the voltage magnitude reference by drooping with a second component. For example, the first component can include a positive-sequence output real power or a positive-sequence output current component along a positive-sequence output voltage vector. The second component can include a positive-sequence reactive power or a positive-sequence output current normal to the positive-sequence output voltage vector.

In some embodiments, the PSM includes a first controller to generate the negative-sequence current reference, the first controller including at least one of a first virtual admittance, or a first voltage controller. In some embodiments, the PSM includes a second controller to generate the positive-sequence current reference, the second controller comprising at least one of a second virtual admittance or a second voltage controller. In some embodiments, the capacity limits include one, more, or all of a minimum active power; a maximum active power; a minimum reactive power; a maximum reactive power; or a maximum current. In some embodiments, to determine the complex gains, the capacity constrainer is configured to predict a deviation between commanded values and the output voltage and the output current along a plurality of components thereof, the components comprising active power, reactive power, and current magnitude.

In some embodiments, the prediction of the deviation is determined according to a deterministic model. In some embodiments, the prediction of the deviation is determined according to an iterative model executed according to a model adapter, the model adapter configured to provide adaptation signals to the power-synchronization model based on the components determined by the capacity constrainer. In some embodiments, the adaptation signals include all or a subset of a first adaptation term for frequency, determined by the model adapter based on active power information, a second adaptation term for voltage based on reactive power information, a scaling factor for active power reference; and a scaling factor for equivalent inertia and damping. In some embodiments, the model adapter includes a single-input-single-output controller to determine an adaptation signal. In some embodiments, the model adapter is a multi-input-multi-output controller to determine an adaptation signal based on a plurality of the components determined by the capacity constrainer. In some embodiments, the grid-forming controller is configured to receive, from a user interface, the capacity limits corresponding to a power output of a DC source, a power output of an inverter, or a reactive-active power mix limit of the inverter; and store, by the grid-forming controller, the capacity limits.

In one aspect, the present disclosure describes a method for controlling grid-forming inverters in an electrical grid. The method includes decomposing, by one or more processors, a measured or estimated output voltage vector and a measured or estimated output current vector into positive-sequence symmetrical components and negative-sequence symmetrical components of the measured or estimated output voltage vector and output current vector. The method includes generating, by the one or more processors based on the decomposed positive-sequence symmetrical components and negative-sequence symmetrical components, symmetrical current references. The method includes adjusting, by the one or more processors, a combined current reference for a power stage of the grid-forming inverter, responsive to determining, by the one or more processors, whether the symmetrical current references violate at least one of a plurality of capacity limits.

In some embodiments, adjusting the combined current reference includes predicting a first deviation between commanded and expected values, generating first adaptation signals based on the first deviation, predicting a second deviation between commanded and expected values, and generating second adaptation signals based on the second deviation.

In some embodiments, generating the adaptation signals includes generating a first adaptation term for frequency based on active power information, generating a second adaptation term for voltage based on reactive power information, generating a scaling factor for active power reference; and generating a scaling factor for equivalent inertia and damping. In some embodiments, adjusting the combined current reference includes predicting a deviation between commanded and expected values according to a deterministic model and providing an updated combined current reference to a current controller for a power stage of grid-forming inverters. In some embodiments, the deviation includes a difference between commanded and expected value for any subset of active power, reactive power, and current magnitude.

In one aspect, the present disclosure describes a grid-forming controller configured. The grid-forming controller is configured to decompose a measured or estimated output voltage vector and a measured or estimated output current vector into positive-sequence symmetrical components and negative-sequence symmetrical components of the measured or estimated output voltage vector and output current vector. The grid-forming controller is configured to generate, based on the decomposed positive-sequence symmetrical components and negative-sequence symmetrical components, symmetrical current references. The grid-forming controller is configured to determine the symmetrical current references violate at least one of a plurality of capacity limits. The grid-forming controller is configured to, responsive to the determination, adjust a combined current reference for a power stage of the grid-forming inverters.

In some embodiments, the grid-forming controller is configured to predict a first deviation between commanded and expected values; generate first adaptation signals based on the first deviation; predict a second deviation between commanded and expected values; and generate second adaptation signals based on the second deviation, the second adaptation signals configured to modulate a positive-sequence symmetrical current reference and a negative-sequence symmetrical current reference, to cause an adjustment to the combined current reference. In some embodiments, the adaptation signals include a first adaptation term for active power based on frequency information, a second adaptation term for reactive power based on voltage information, a scaling factor for active power, and a scaling factor for reactive power.

In some embodiments, the adjustment to the combined current reference is based on a provision, by the grid-forming controller, of an updated combined current reference to a current controller for a power stage, the updated combined current reference based on a prediction, of the grid-forming controller, of a deviation between commanded and expected values according to a deterministic model. In some embodiments, the deviation includes a difference between a commanded and expected value for active power, reactive power, and current magnitude.

In an aspect, the present disclosure describes a capacity-optimized AC grid forming controller for power electronics converters, comprising a power-synchronization model; a capacity constraint enforcement block; and a model adaptation block; wherein the power synchronization block receives positive- and negative-sequence symmetrical components of the measured or estimated output voltage and current and generates-(a) internal voltage phase reference by drooping frequency with positive-sequence output real power or positive-sequence output current component along the positive-sequence output voltage vector and (b) voltage magnitude reference by drooping with positive-sequence reactive power or the positive-sequence output current component normal to the positive-sequence output voltage vector, or generates (a) and (b) by using a virtual synchronous machine model, and subsequently the resulting voltage reference is used by a set of voltage controllers or virtual admittances which generate positive- and negative-sequence symmetrical current references, wherein, the capacity-constraint enforcement block, to minimize violation of static or dynamic capacity limits, such as active-power, reactive-power, and current capacity limit, and to enable prioritization of active power over reactive power or vice versa, performs iterative or deterministic constrained optimization to generate complex or scalar gains for the symmetrical current references and subsequently predicts the resulting deviations in output active-power, reactive-power, and current magnitude from the respective values commanded by the power synchronization block, wherein, the model adaptation block uses multiple single-input-single-output compensators or a multi-input-multi-output compensator with the predicted deviations by the capacity-constraint enforcement block as inputs to generate adaptation signals which dynamically adjust the voltage phase and magnitude reference generation laws in the power synchronization model, and wherein, the scaled symmetrical current references are tracked by current controllers which may include high-frequency resonance damping controllers.

In an aspect, the present disclosure describes a capacity-optimized AC grid forming controller for power electronics converters, comprising a power-synchronization model; a capacity constraint enforcement block; and a model adaptation block; wherein the power synchronization block receives positive- and negative-sequence symmetrical components of the measured or estimated output voltage and current and generates-(a) internal voltage phase reference by drooping frequency with positive-sequence output real power or positive-sequence output current component along the positive-sequence output voltage vector and (b) voltage magnitude reference by drooping with positive-sequence reactive power or the positive-sequence output current component normal to the positive-sequence output voltage vector, or generates (a) and (b) by using a virtual synchronous machine model, and subsequently the resulting voltage reference is used by a set of voltage controllers or virtual admittances which generate positive- and negative-sequence symmetrical current references, wherein, the capacity-constraint enforcement block, to minimize active-power, reactive-power, and current capacity limit violations and to enable prioritization of active power over reactive power or vice versa, performs iterative or deterministic constrained optimization to generate complex or scalar gains for the symmetrical current references and subsequently predicts the resulting deviations in output active-power, reactive-power, and current magnitude from the respective values commanded by the power synchronization block, wherein, the model adaptation block uses multiple single-input-single-output compensators or a multi-input-multi-output compensator with the predicted deviations by the capacity-constraint enforcement block as inputs to generate adaptation signals which dynamically adjust the voltage phase and magnitude reference generation laws in the power synchronization model, and wherein, the scaled symmetrical current references are tracked by current controllers which may include high-frequency resonance damping controllers.

In an aspect, the present disclosure describes a method for controlling grid-forming inverters in an electrical grid, comprising iteratively and until determining each of a plurality of real or reactive power or current constraints of a power converter are satisfied decomposing, by one or more processors, measured or estimated output voltage and current vectors into positive-sequence symmetrical components and negative-sequence symmetrical components of the measured or estimated output voltage and current vectors; generating, by the one or more processors according to one or more defined signal synchronization parameters corresponding to the electrical grid and one or more electricity reference signals, symmetrical current references based on the decomposed positive-sequence symmetrical components and negative-sequence symmetrical components of the measured or estimated output voltage and current vectors; responsive to determining, by the one or more processors, the symmetrical current references violate at least one of the plurality of real or reactive power or current constraints of the power converter of the electrical grid, adjusting, by the one or more processors, the one or more electrical quantity reference signals.

In an illustrative embodiment, any of the operations described herein can be implemented at least in part as computer-readable instructions stored on a computer-readable memory. Upon execution of the computer-readable instructions by a processor, the computer-readable instructions can cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A capacity-optimized AC grid-forming controller for power electronics converters, comprising:
    a power-synchronization model configured to:
        receive positive-sequence symmetrical components and negative-sequence symmetrical components of an output voltage and an output current;
        generate a plurality of current references comprising a positive-sequence current reference and a negative-sequence current reference; and
        generate an internal voltage phase reference and voltage magnitude reference; and a capacity constrainer configured to:
        determine, based on the plurality of current references and a plurality of capacity limit terms, that a device coupled with the capacity-optimized AC grid-forming controller is capacity constrained;
        determine optimum complex gains to scale the plurality of current references based on the plurality of capacity limit terms; and
        responsive to the determination of capacity constraint, output scaled current reference to cause a power stage for the capacity-optimized AC grid-forming controller to adjust the output voltage or the output current, the scaled current reference scaled according to the optimum complex gains.

2. The capacity-optimized AC grid-forming controller of claim 1, wherein the power-synchronization model comprises a virtual synchronous machine model configured to:
    generate a voltage phase reference and the voltage magnitude reference; and
    generate the plurality of current references using the voltage phase reference and the voltage magnitude reference.

3. The capacity-optimized AC grid-forming controller of claim 1, wherein the power-synchronization model is configured to:
    generate a voltage phase reference by drooping frequency with a first component of a positive sequence output component; and
    generate the voltage magnitude reference by drooping with a second component.

4. The capacity-optimized AC grid-forming controller of claim 3, wherein:
    the first component comprises:
        a positive-sequence output real power; or
        a positive-sequence output current component along a positive-sequence output voltage vector; and
    the second component comprises:
        a positive-sequence reactive power; or
        a positive-sequence output current normal to the positive sequence output voltage vector.

5. The capacity-optimized AC grid-forming controller of claim 1, wherein the power-synchronization model comprises:
    a first controller to generate the negative-sequence current reference, the first controller comprising at least one of:
        a first virtual admittance; or
        a first voltage controller; and a second controller to generate the positive-sequence current reference, the second controller comprising at least one of:
a second virtual admittance; or
a second voltage controller.

6. The capacity-optimized AC grid-forming controller of claim 1, wherein the plurality of capacity limit terms comprise:
a minimum active power;
a maximum active power;
a minimum reactive power;
a maximum reactive power; and
a maximum current.

7. The capacity-optimized AC grid-forming controller of claim 1, wherein, to determine the optimum complex gains, the capacity constrainer is configured to predict a deviation between commanded values and the output voltage and the output current along a plurality of components thereof, the plurality of components comprising:
active power;
reactive power; and
current magnitude.

8. The capacity-optimized AC grid-forming controller of claim 7, wherein the prediction of the deviation is fed to a model adapter, the model adapter configured to provide, to the power-synchronization model, adaptation signals based on the plurality of components determined by the capacity constrainer.

9. The capacity-optimized AC grid-forming controller of claim 8, wherein the adaptation signals comprise:
a first adaptation term for frequency determined, by the model adapter, based on active power information; and
a second adaptation term for voltage based on reactive power information; or
a scaling factor for active power reference; and
a scaling factor for equivalent inertia and damping.

10. The capacity-optimized AC grid-forming controller of claim 9, configured to:
receive, from a user interface, the plurality of capacity limit terms, the plurality of capacity limit terms corresponding to:
a power output of a DC source;
a power output of an inverter; or
a reactive-active power mix limit of the inverter; and
store, by the capacity-optimized AC grid-forming controller, the plurality of capacity limit terms.

11. A method for controlling grid-forming inverters in an electrical grid, comprising:
decomposing, by one or more processors, a measured or estimated output voltage vector and a measured or estimated output current vector into positive-sequence symmetrical components and negative-sequence symmetrical components of the measured or estimated output voltage vector and output current vector;
generating, by the one or more processors based on the decomposed positive-sequence symmetrical components and negative-sequence symmetrical components, symmetrical current references; and
responsive to determining, by the one or more processors, the symmetrical current references violate at least one of a plurality of capacity limit terms, adjusting, by the one or more processors, a combined current reference for a power stage of the grid-forming inverters.

12. The method of claim 11, wherein adjusting the combined current reference comprises:
predicting, by the one or more processors, a first deviation between commanded and expected values;
generating, by the one or more processors, first adaptation signals based on the first deviation;
predicting, by the one or more processors, a second deviation between the commanded and expected values; and
generating, by the one or more processors, second adaptation signals based on the second deviation.

13. The method of claim 12, wherein generating the first adaptation signals and the second adaptation signals comprises:
generating, by the one or more processors, a first adaptation term for frequency based on active power information; and
generating, by the one or more processors, a second adaptation term for voltage based on reactive power information; or
generating, by the one or more processors, a scaling factor for active power reference; and
generating, by the one or more processors, a scaling factor for equivalent inertia and damping.

14. The method of claim 11, wherein adjusting the combined current reference comprises:
predicting, by the one or more processors, a deviation between commanded and expected values according to a deterministic model; and
providing, by the one or more processors, an updated combined current reference to a current controller for the power stage of the grid-forming inverters.

15. The method of claim 14, wherein the deviation comprises a difference between commanded and expected:
active power;
reactive power; and
current magnitude.

16. A grid-forming controller configured to:
decompose a measured or estimated output voltage vector and a measured or estimated output current vector into positive-sequence symmetrical components and negative-sequence symmetrical components of the measured or estimated output voltage vector and output current vector;
generate, based on the decomposed positive-sequence symmetrical components and negative-sequence symmetrical components, symmetrical current references;
determine the symmetrical current references violate at least one of a plurality of capacity limit terms; and
responsive to the determination, adjust a combined current reference for a power stage of grid-forming inverters.

17. The grid-forming controller of claim 16, wherein the grid-forming controller is configured to:
predict a first deviation between commanded and expected values;
generate first adaptation signals based on the first deviation;
predict a second deviation between the commanded and expected values; and
generate second adaptation signals based on the second deviation, the second adaptation signals configured to modulate a positive-sequence symmetrical current reference and a negative-sequence symmetrical current reference, to cause the adjustment to the combined current reference.

18. The grid-forming controller of claim 17, wherein the first adaptation signals and the second adaptation signals comprise:
a first adaptation term for frequency determined, by a model adapter, based on active power information;

a second adaptation term for voltage based on reactive power information;

a scaling factor for active power reference; and a scaling factor for equivalent inertia and damping.

19. The grid-forming controller of claim 16, wherein the adjustment to the combined current reference is based on a provision, by the grid-forming controller, of an updated combined current reference to a current controller for the power stage, the updated combined current reference based on a prediction, of the grid-forming controller, of a deviation between commanded and expected values according to a deterministic model.

20. The grid-forming controller of claim 19, wherein the deviation includes a difference between the commanded and expected values for:

active power; reactive power; and current magnitude.

* * * * *